(12) United States Patent
Abe et al.

(10) Patent No.: US 12,476,019 B2
(45) Date of Patent: Nov. 18, 2025

(54) CONDUCTIVE FILM AND METHOD FOR PRODUCING THE SAME

(71) Applicant: Murata Manufacturing Co., Ltd., Nagaokakyo (JP)

(72) Inventors: Masanori Abe, Nagaokakyo (JP); Takeshi Torita, Nagaokakyo (JP); Toshiko Shimazaki, Nagaokakyo (JP); Hiroki Sakamoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 337 days.

(21) Appl. No.: 18/349,593

(22) Filed: Jul. 10, 2023

(65) Prior Publication Data

US 2023/0352205 A1 Nov. 2, 2023

Related U.S. Application Data

(63) Continuation of application No. PCT/JP2022/000039, filed on Jan. 4, 2022.

(30) Foreign Application Priority Data

Jan. 13, 2021 (JP) ................. 2021-003543

(51) Int. Cl.
*H01B 1/06* (2006.01)
*H01B 5/00* (2006.01)
*H05K 9/00* (2006.01)

(52) U.S. Cl.
CPC ............. *H01B 1/06* (2013.01); *H01B 5/00* (2013.01); *H05K 9/0081* (2013.01)

(58) Field of Classification Search
None
See application file for complete search history.

(56) References Cited

U.S. PATENT DOCUMENTS

| 10,573,768 B2 | 2/2020 | Ghidiu et al. |
| 11,296,243 B2 | 4/2022 | Ghidiu et al. |

(Continued)

FOREIGN PATENT DOCUMENTS

| CN | 107001051 A | 8/2017 |
| CN | 109207834 A * | 1/2019 ............... C22C 9/00 |

(Continued)

OTHER PUBLICATIONS

Ghidiu—IDS—ion exchange cation solvation MXene—Chem. Mat. ACS—2016 (Year: 2016).*

(Continued)

*Primary Examiner* — John Vincent Lawler
(74) *Attorney, Agent, or Firm* — ArentFox Schiff LLP

(57) ABSTRACT

The conductive film that includes: particles of a layered material including one or plural layers, the one or plural layers including a layer body represented by: $M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, or a hydrogen atom; and one or more transition elements selected from the group consisting of Ti, V, Cr, Zr, Nb, Mo, Hf, Ta, W, or Y.

19 Claims, 12 Drawing Sheets

(56) References Cited

U.S. PATENT DOCUMENTS

| | | | |
|---|---|---|---|
| 12,015,092 B2 | 6/2024 | Ghidiu et al. | |
| 2014/0162130 A1* | 6/2014 | Barsoum | C01B 32/914 |
| | | | 429/231.8 |
| 2017/0294546 A1* | 10/2017 | Ghidiu | C01B 32/949 |
| 2019/0166733 A1* | 5/2019 | Gogotsi | H05K 9/0084 |
| 2020/0102444 A1* | 4/2020 | Cho | C08K 9/04 |
| 2020/0176619 A1 | 6/2020 | Ghidiu et al. | |
| 2020/0231507 A1 | 7/2020 | Sato et al. | |
| 2022/0181507 A1 | 6/2022 | Ghidiu et al. | |

FOREIGN PATENT DOCUMENTS

| | | |
|---|---|---|
| CN | 109417863 A | 3/2019 |
| CN | 110698847 A | 1/2020 |
| JP | 2020093971 A | 6/2020 |
| WO | 2020136864 A1 | 7/2020 |

OTHER PUBLICATIONS

Wang—CN 109207834 A—IDS—MT—modified MXene powder to reinforce metals—2019 (Year: 2019).*

Ghidiu et al., "Ion-Exchange and Cation Solvation Reactions in Ti3C2 MXene," Chemistry of Materials, 2016, vol. 28, pp. 3507-3514.

International Search Report in PCT/JP2022/000039, mailed Mar. 29, 2022, 3 pages.

\* cited by examiner

Fig. 1
*Fig. 1(a)*
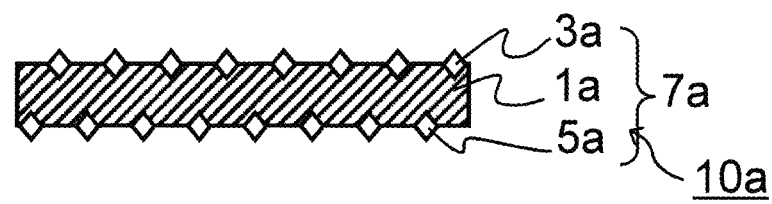
*Fig. 1(b)*
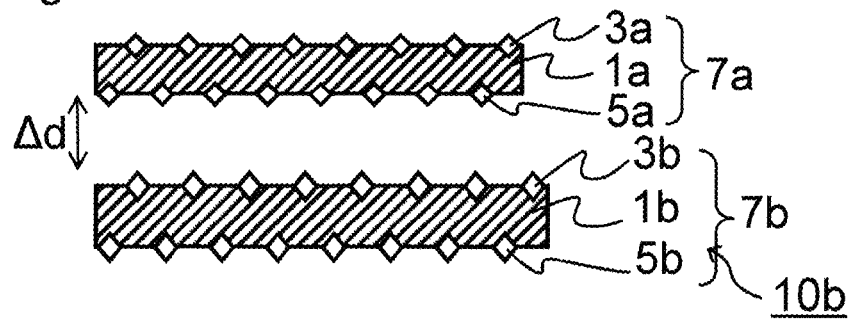

CONDUCTIVE FILM AND METHOD FOR PRODUCING THE SAME

CROSS REFERENCE TO RELATED APPLICATIONS

The present application is a continuation of International application No. PCT/JP2022/000039, filed Jan. 4, 2022, which claims priority to Japanese Patent Application No. 2021-003543, filed Jan. 13, 2021, the entire contents of each of which are incorporated herein by reference.

TECHNICAL FIELD

The present disclosure relates to a conductive film and a method for producing the same.

BACKGROUND ART

In recent years, MXene has been attracting attention as a new material having conductivity. MXene is a type of so-called two-dimensional material, and as will be described later, is a layered material in the form of one or plural layers. In general, MXene is in the form of particles (which may be referred to as MXene particles and can include powders, flakes, nanosheets, and the like) of such a layered material.

Currently, various studies are being conducted toward the application of MXene to various electrical devices. For the above application, it is required to further enhance the characteristics such as the conductivity and the strength of a material containing MXene. As a part of the study, attempts have been made to insert metal ions into MXene. For example, Patent Document 1 proposes that metal nanoparticles such as nanonickel particles, nanocopper particles, nanoaluminum particles, and nanomagnesium particles are contained on the surface and between layers of MXene powder to increase the strength of MXene.

In addition, Non-patent Document 1 discloses that a Li cation exists in an interlayer space of MXene due to LiCl used in chemical etching, and that a structural change of a powder occurs by exchanging the Li cation with another metal ion.

Patent Document 1: Chinese Patent Application Publication No. 109207834

Non-patent Document 1: Michael Ghidiu et al., "Ion-Exchange and Cation Solvation Reactions in Ti3C2 MXene", Chemistry of Materials, 2016, Volume 28, pp. 3507-3514

SUMMARY OF THE INVENTION

A new material having conductivity is required to have high initial conductivity and to suppress deterioration of the conductivity over time due to moisture absorption, that is, to exhibit stable conductivity, but Patent Document 1 and Non-patent Document 1 do not disclose that these characteristics are enhanced. The present disclosure has been made in view of the above circumstances, and an object of the present disclosure is to provide a conductive film having high initial conductivity and exhibiting stable conductivity, and a method for producing the same.

According to one aspect of the present invention, there is provided a conductive film comprising: particles of a layered material including one or plural layers, the one or plural layers including a layer body represented by:

$$M_m X_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, or a hydrogen atom, and one or more transition elements selected from the group consisting of Ti, V, Cr, Zr, Nb, Mo, Hf, Ta, W, or Y.

According to another aspect of the present invention, there is provided a method for producing a conductive film, the method comprising:

(a1) preparing a precursor film including particles of a layered material including one or plural layers, the one or plural layers including a layer body represented by:

$$M_m X_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, or a hydrogen atom; and (b1) coating the precursor film with a solution containing one or more transition elements selected from the group consisting of Ti, V, Cr, Zr, Nb, Mo, Hf, Ta, W, or Y in a solvent as ions.

According to the present disclosure, there is provided a conductive film which is formed of a predetermined layered material (also referred to as "MXene" in the present specification), and which contains one or more transition elements selected from the group consisting of Ti, V, Cr, Zr, Nb, Mo, Hf, Ta, W, or Y Such a conductive film has an excellent initial conductivity and is excellent in conductivity stability.

Further, according to the present disclosure, the conductive film can be produced by (a1) preparing a predetermined precursor film, and (b1) coating the precursor film with a solution containing one or more transition elements selected from the group consisting of Ti, V, Cr, Zr, Nb, Mo, Hf, Ta, W, or Y in a solvent as ions.

BRIEF DESCRIPTION OF THE DRAWINGS

FIG. 1 is a schematic cross-sectional view illustrating MXene which is a layered material usable for a conductive film in one aspect of the present embodiment, in which FIG. 1(a) illustrates single-layer MXene, and FIG. 1(b) illustrates multilayer (exemplarily two-layered) MXene.

FIGS. 2(a) and 2(b) are schematic explanatory views of a mechanism of exhibiting adsorption resistance of the conductive film of the present invention, in which FIG. 2(a) illustrates a known MXene film having no transition element, and FIG. 2(b) illustrates a MXene film (conductive film) containing a transition element.

FIGS. 7(a) to 7(c) are photographs illustrating results of a first tape peeling test in Examples, in which FIG. 7(a) is a photograph of Example 1, FIG. 7(b) is a photograph of Comparative Example 1, and FIG. 7(c) is a photograph of Comparative Example 2.

FIGS. 8(a) to 8(c) are photographs illustrating results of a second tape peeling test in Examples, in which FIG. 8(a) is a photograph of Example 1, FIG. 8(b) is a photograph of Comparative Example 1, and FIG. 8(c) is a photograph of Comparative Example 2.

DETAILED DESCRIPTION OF THE PREFERRED EMBODIMENTS

Embodiment 1: Conductive Film

Figure 2A:
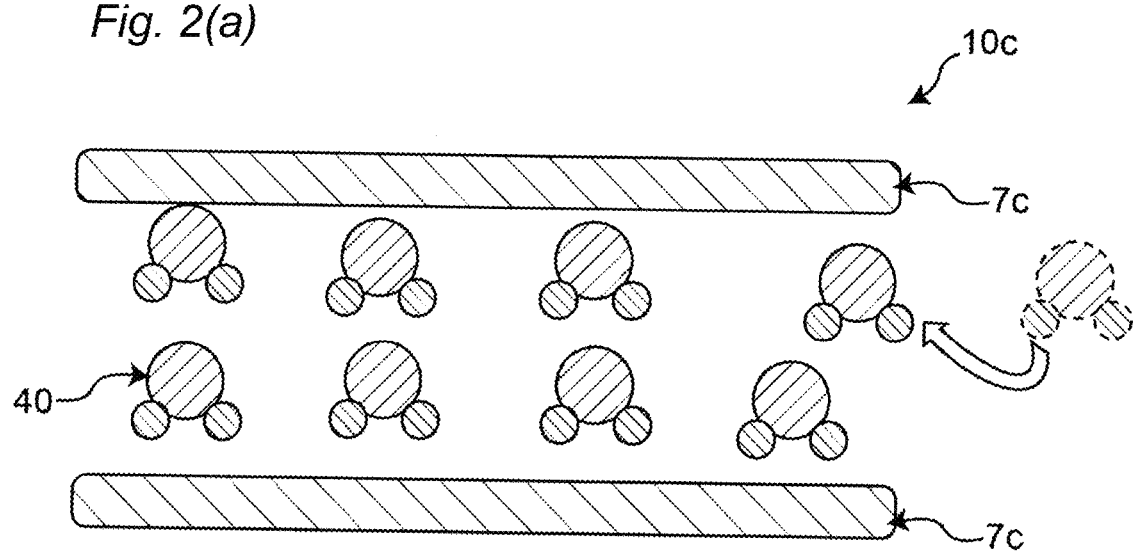

Hereinafter, a conductive film in one embodiment of the present invention will be described in detail, but the present disclosure is not limited to such an embodiment.

A conductive film in the present embodiment includes particles of a layered material including one or plural layers, the one or plural layers including a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, or a hydrogen atom; and one or more transition elements selected from the group consisting of Ti, V, Cr, Zr, Nb, Mo, Hf, Ta, W, or Y.

In the present specification, in order to distinguish the conductive film of the present embodiment from the MXene film containing no transition element as described above, the conductive film may be referred to as a "transition element-containing MXene film" or a "transition element ion-supported MXene film". In the producing method of the present embodiment, the MXene film containing no transition element is referred to as a "precursor film". Furthermore, the layered material constituting the precursor film may be referred to as "MXene", the particles thereof may be referred to as "MXene particles", and the particles of the layered material constituting the conductive film of the present embodiment may be referred to as "transition element-containing MXene particles".

The layered material can be understood as a layered compound and is also denoted by "$M_mX_nT_s$", in which s is an optional number, and in the related art, x or z may be used instead of s. Typically, n can be 1, 2, 3, or 4, but is not limited thereto.

In the above formula of MXene, M is preferably at least one selected from the group consisting of Ti, Zr, Hf, V, Nb, Ta, Cr, Mo, or Mn, and more preferably at least one selected from the group consisting of Ti, V, Cr, or Mo.

MXenes whose above formula $M_mX_n$ is expressed as below are known:

$Sc_2C$, $Ti_2C$, $Ti_2N$, $Zr_2C$, $Zr_2N$, $Hf_2C$, $Hf_2N$, $V_2C$, $V_2N$, $Nb_2C$, $Ta_2C$, $Cr_2C$, $Cr_2N$, $Mo_2C$, $Mo_{1.3}C$, $Cr_{1.3}C$, $(Ti,V)_2C$, $(Ti,Nb)_2C$, $W_2C$, $W_{1.3}C$, $Mo_2N$, $Nb_{1.3}C$, $Mo_{1.3}Y_{0.6}C$ (In the above formula, "1.3" and "0.6" mean about 1.3 (=4/3) and about 0.6 (=2/3), respectively.), $Ti_3C_2$, $Ti_3N_2$, $Ti_3(CN)$, $Zr_3C_2$, $(Ti,V)_3C_2$, $(Ti_2Nb)C_2$, $(Ti_2Ta)C_2$, $(Ti_2Mn)C_2$, $Hf_3C_2$, $(Hf_2V)C_2$, $(Hf_2Mn)C_2$, $(V_2Ti)C_2$, $(Cr_2Ti)C_2$, $(Cr_2V)C_2$, $(Cr_2Nb)C_2$, $(Cr_2Ta)C_2$, $(Mo_2Sc)C_2$, $(Mo_2Ti)C_2$, $(Mo_2Zr)C_2$, $(Mo_2Hf)C_2$, $(Mo_2V)C_2$, $(Mo_2Nb)C_2$, $(Mo_2Ta)C_2$, $(W_2Ti)C_2$, $(W_2Zr)C_2$, $(W_2Hf)C_2$, $Ti_4N_3$, $V_4C_3$, $Nb_4C_3$, $Ta_4C_3$, $(Ti,Nb)_4C_3$, $(Nb,Zr)_4C_3$, $(Ti_2Nb_2)C_3$, $(Ti_2Ta_2)C_3$, $(V_2Ti_2)C_3$, $(V_2Nb_2)C_3$, $(V_2Ta_2)C_3$, $(Nb_2Ta_2)C_3$, $(Cr_2Ti_2)C_3$, $(Cr_2V_2)C_3$, $(Cr_2Nb_2)C_3$, $(Cr_2Ta_2)C_3$, $(Mo_2Ti_2)C_3$, $(Mo_2Zr_2)C_3$, $(Mo_2Hf_2)C_3$, $(Mo_2V_2)C_3$, $(Mo_2Nb_2)C_3$, $(Mo_2Ta_2)C_3$, $(W_2Ti_2)C_3$, $(W_2Zr_2)C_3$, $(W_2Hf_2)C_3$, $(Mo_{2.7}V_{1.3})C_3$ (In the above formula, "2.7" and "1.3" mean about 2.7 (=8/3) and about 1.3 (=4/3), respectively.), Typically in the above formula, M can be titanium or vanadium and X can be a carbon atom or a nitrogen atom. For example, the MAX phase is $Ti_3AlC_2$ and MXene is $Ti_3C_2T_s$ (in other words, M is Ti, X is C, n is 2, and m is 3).

It is noted, in the present disclosure, MXene may contain remaining A atoms at a relatively small amount, for example, at 10 mass % or less with respect to the original amount of A atoms. The remaining amount of A atoms can be preferably 8 mass % or less, and more preferably 6 mass % or less. However, even if the residual amount of A atoms exceeds 10 mass %, there may be no problem depending on the application and use conditions of conductive films.

The structure corresponding to the skeleton of the transition element-containing MXene particle according to the present embodiment is the same as that of the MXene particle constituting the precursor film, except that the transition element-containing MXene particle contains a transition element and the interlayer distance of the layered material is increased accordingly. Hereinafter, the structure corresponding to the skeleton of the transition element-containing MXene particle is described, and the transition element is not illustrated in FIG. 1.

The MXene particle is an aggregate containing one layer of MXene 10a (single-layer MXene) schematically illustrated in FIG. 1. More specifically, MXene 10a is an MXene layer 7a having layer body ($M_mX_n$ layer) 1a represented by $M_mX_n$, and modifier or terminals T3a and 5a existing on the surface (more specifically, at least one of two surfaces facing each other in each layer) of the layer body 1a. Therefore, the MXene layer 7a is also represented as "$M_mX_nT_s$", and s is an optional number.

The MXene particle may include one layer and plural layers. Examples of the MXene (multilayer MXene) of the plural layers include, but are not limited to, two layers of MXene 10b as schematically illustrated in FIG. 1(b). 1b, 3b, 5b, and 7b in FIG. 1(b) are the same as 1a, 3a, 5a, and 7a in FIG. 1(a) described above. Two adjacent MXene layers (for example, 7a and 7b) of the multilayer MXene do not necessarily have to be completely separated from each other, and may be partially in contact with each other. The MXene 10a may be a mixture of the single-layer MXene 10a and the multilayer MXene 10b, in which the multilayer MXene 10b is individually separated and exists as one layer and the unseparated multilayer MXene 10b remains.

Although the present embodiment is not limited, the thickness of each layer of MXene (which corresponds to the MXene layers 7a and 7b) is, for example, not less than 0.8 nm and not more than 5 nm, particularly not less than 0.8 nm and not more than 3 nm (which may mainly vary depending on the number of M atom layers included in each layer). For the individual laminates of the multilayer MXene that can be included, the interlayer distance (alternatively, a void dimension is indicated by $\Delta d$ in FIG. 1(b)) is, for example, 0.8 nm to 10 nm, particularly 0.8 nm to 5 nm, and more particularly about 1 nm, and the total number of layers can be 2 to 20,000.

In the MXene particle, the multilayer MXene is preferably MXene having a few layers obtained through the delamination treatment. The term "the number of layers is small" means that, for example, the number of stacked layers of MXene is 6 or less. The thickness, in a stacking direction, of the multilayer MXene having a few layers is preferably 10 nm or less. Hereinafter, the "multilayer MXene having a few layers" may be referred to as a "few-layer MXene" in some cases. In addition, the single-layer MXene and the few-layer MXene may be collectively referred to as "single-layer/few-layer MXene" in some cases.

The MXene particles preferably include a single-layer MXene and a few-layer MXene, that is, a single-layer/few-layer MXene. In the conductive film of the present embodiment, the ratio of the single-layer/few-layer MXene having a thickness of 10 nm or less may be 50 vol % or more, 70 vol % or more, 90 vol % or more, and 95 vol % or more.

The conductive film according to the embodiment contains one or more transition elements selected from the group consisting of Ti, V, Cr, Zr, Nb, Mo, Hf, Ta, W, or Y Although it is known that MXene interacts with the d orbital of the metal, among them, electrons of the d orbital of these transition elements are likely to interact with $\pi$ electrons of MXene, and it is considered to contribute to the improvement of the stability of the conductivity since it is easy to secure the action of holding the layers of MXene. In addition, by exerting the action of holding the layers of MXene, it can also contribute to the improvement of the strength of the conductive film. The transition element may be the same as or different from the element constituting MXene. In the conductive film of the present embodiment, it is preferable that ions of the transition element are supported on MXene. That is, the transition element-containing MXene particles are preferably transition element-supported MXene particles. In the present specification, "supported" refers to a state in which the transition element does not constitute MXene itself, and an ion of a transition metal or an inorganic acid salt of a transition metal is present between layers of MXene. The inorganic acid salt may be, for example, an inorganic acid salt used in step (b1) or step (d2) in the method for producing a conductive film. In the case of, for example, titanium sulfate as the inorganic acid salt, titanium ions can exist between the layers of MXene in a state of being bound to sulfate ions as counter ions.

A distinction between a bond between an ion of a transition metal and a counter ion in an inorganic acid salt and a bond between a transition metal and carbon or nitrogen in a carbide or nitride of a transition metal that is considered to be mixed as, for example, an impurity can be confirmed by X-ray photoelectron spectroscopy (XPS). The presence of the transition element between the MXene sheet layers can be confirmed by, for example, a transmission electron microscope (TEM).

Among the above transition elements, one or more of Ti, Cr, and Y are preferable, and Ti is most preferable.

The transition element is preferably present between the layers. When the transition element is, for example, Ti, as schematically exemplified in FIG. 2(b), it is considered that particularly ions (in the case of FIG. 2(b), Ti ions 41) of the transition element are intercalated between the layers of the transition element-containing MXene particles 10d, Ti ions 41 are supported between the layers of the transition element-containing MXene particles 10d, and the Ti ions 41 act to bind the layer 7d and the layer 7d together. In known MXene particles 10c, water molecules 40 easily enter between the layer 7c and the layer 7c, and a decrease in conductivity due to the presence of the water molecules 40, that is, deterioration over time of conductivity due to moisture absorption cannot be suppressed. On the other hand, according to the transition element-containing MXene particles 10d, as illustrated in FIG. 2(b), entry of the water molecules 40 into layers is suppressed, and deterioration over time of the conductivity due to the moisture absorption can be suppressed, and it is considered that a high conductivity can be maintained without significantly decreasing the initial conductivity. Furthermore, it is considered that ions of the transition element are bonded to the layer 7d and the layer 7d of the transition element-containing MXene particles 10d, thereby contributing to securing the strength of the MXene film. Furthermore, although it is merely a presumption, it is considered that electron transfer is promoted by interaction of transition element ions with MXene as described above, and this may contribute to achievement of high initial conductivity.

In addition, in the present disclosure, in order to verify the effect of the conductive film according to the present invention, the MXene film as a reference used for comparison of moisture absorption resistance is assumed to have a state in which a MAX phase preparation step including a calcining step and a pulverization step, an etching treatment step, a delamination step, and a concentration step are the same as those in the method for producing a conductive film according to the present invention, and Li is contained in some form in the MXene film.

Figure 2B:
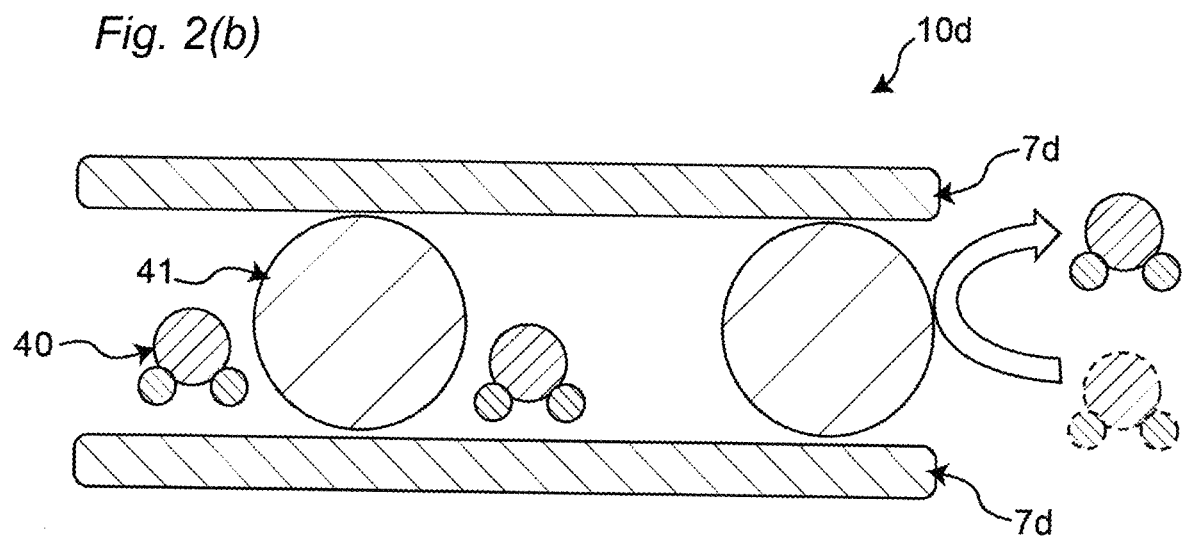

In FIG. 2, the interlayer in the multilayer MXene (particle) has been described as an example, but the "between layers" of the transition element-containing MXene particle in the present embodiment is not limited thereto, and for example, the "between layers" means between the single-layer MXene (particle) and another single-layer MXene (particle) and between the single-layer MXene (particle) and the multilayer MXene (particle).

Figure 3:
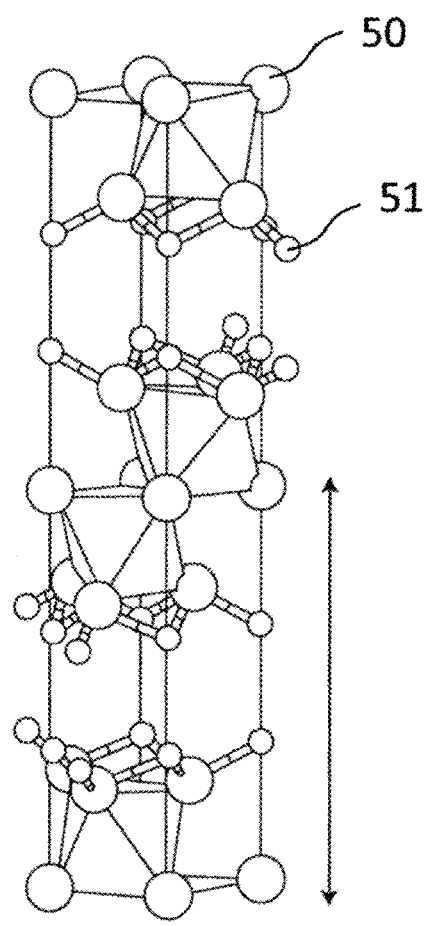
FIG. 3 is a diagram for explaining an interlayer distance in transition element-containing MXene particles according to the present invention.

In the conductive film of the present embodiment, ions of a transition element preferably exist between layers constituting MXene, and a distance between the layers constituting MXene is shorter than that of the MXene film not containing the transition element. The above "distance between layers constituting MXene" refers to a distance indicated by a double-headed arrow in FIG. 3 when $M_mX_n$ is $Ti_3C_2O_2$ (O-term) represented by $Ti_3C_2$, the crystal structure is as schematically illustrated in FIG. 3 (in FIG. 3, reference numeral 50 denotes a titanium atom, reference numeral 51 denotes an oxygen atom, and other elements are omitted). The distance can be determined by the position of a low-angle peak of 11° (deg) or less corresponding to the (002) plane of MXene in an XRD profile obtained by X-ray diffraction measurement. The higher the peak in the XRD profile is, the narrower the interlayer distance is. The peak refers to a peak top. The X-ray diffraction measurement may be performed under the conditions shown in examples described later. Examples of the position of the low angle peak include a range of 5 to 11°, and among them, for example, 6.2° or more, and further 6.3° or more.

When the $M_mX_n$ is represented by $Ti_3C_2$ and the transition element is Ti, the conductive film of the present embodiment has a peak at 52° to 58° and a peak at 45° to 49° in a profile obtained by X-ray diffraction measurement of the conductive film, so that it can be determined that the conductive film has Ti supported as a transition element, separately from Ti forming the skeleton of MXene.

The angle difference between the two peaks, that is, the difference in angle (unit deg) obtained by (the angle of the peak located at 52° to 58°)−(the angle of the peak at 45° to 49°) can be in the range of 7° to 10°.

In the present specification, the peak in the XRD profile, particularly, the peak located at 52° to 58° and the peak located at 45° to 49° refer to a peak having a height when a portion having a higher numerical value (that is, having a positive extreme value) than measurement points at one point before and after the XRD profile is regarded as a peak vertex, and a perpendicular line is drawn from the peak vertex to the base line as a peak height, and the peak height is 1/500 or more of the peak corresponding to the (002) plane.

The initial conductivity of the conductive film of the present embodiment is obtained by measuring the thickness of the conductive film by micrometer, the scanning electron microscope (SEM), or a stylus surface profiler, and substituting the thickness of the conductive film and a surface resistivity of the conductive film measured by a four-point probe method into the following formula to achieve 5,000 S/cm or more.

Conductivity [S/cm]=1/(thickness [cm] of conductive film X surface resistivity [Ω/sq.] of conductive film)

The measuring of the thickness of the conductive film by any one of a micrometer, a scanning electron microscope, and a stylus surface profiler can be determined depending on the thickness of the conductive film. As an indication of adoption of the measurement method, the measurement with the micrometer may be used when the thickness of the conductive film is thin. The conductive film may be used when the thickness of the conductive film is 5 μm or more. The measurement with the stylus surface profiler is used when the thickness of the conductive film is 400 μm or less, and the measurement with the scanning electron microscope is used when the thickness of the conductive film is 200 μm or less and cannot be measured with the stylus surface profiler. In the case of measurement with the scanning electron microscope, the measurement magnification may be determined depending on the film thickness. If measured with a stylus surface profiler, the measurement is made with a Dektak (registered trademark) instrument from Veeco Instruments Inc. The thickness of the conductive film is calculated as an average value.

The term "excellent in the stability of the electrical conductivity" means that the electrical conductivity after 4 weeks in a state of being exposed to an environment at a temperature of 25° C. and a humidity of 99% is 10% or more, preferably 20% or more of the initial electrical conductivity, as shown in Examples described later.

The conductive film of the present embodiment can be used for any suitable application. For example, it may be used in applications where maintaining high conductivity (to reduce a decrease in initial conductivity and prevent oxidation) is required, such as electrodes or electromagnetic shielding (EMI shielding) in any suitable electric device.

The electrode is not particularly limited, and may be, for example, a capacitor electrode, a battery electrode, a biosignal sensing electrode, a sensor electrode, an antenna electrode, or the like. By using the conductive film of the present embodiment, it is possible to obtain a large-capacity capacitor and battery, a low-impedance biosignal sensing electrode, a highly sensitive sensor, and an antenna even with a smaller volume (device occupied volume).

The capacitor may be an electrochemical capacitor. The electrochemical capacitor is a capacitor using capacitance developed due to a physicochemical reaction between an electrode (electrode active material) and ions (electrolyte ions) in an electrolytic solution, and can be used as a device (power storage device) that stores electric energy. The battery may be a repeatedly chargeable and dischargeable chemical battery. The battery may be, for example, but not limited to, a lithium ion battery, a magnesium ion battery, a lithium sulfur battery, a sodium ion battery, or the like.

The biosignal sensing electrode is an electrode for acquiring a biological signal. The biosignal sensing electrode may be, for example, but not limited to, an electrode for measuring electroencephalogram (EEG), electrocardiogram (ECG), electromyogram (EMG), electrical impedance tomography (EIT).

The sensor electrode is an electrode for detecting a target substance, state, abnormality, or the like. The sensor may be, for example, but not limited to, a gas sensor, a biosensor (a chemical sensor utilizing a molecular recognition mechanism of biological origin), or the like.

The antenna electrode is an electrode for emitting an electromagnetic wave into a space and/or receiving an electromagnetic wave in the space.

Embodiment 2: Method for Producing Conductive Film

Hereinafter, a method for producing a conductive film in the embodiment of the present invention will be described in detail, but the present disclosure is not limited to such an embodiment.

A first method for producing a conductive film (first producing method) of the present embodiment, the method includes:

(a1) preparing a precursor film including particles of a layered material including one or plural layers, the one or plural layers including a layer body represented by:

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, or a hydrogen atom; and (b1) coating the precursor film with a solution containing one or more transition elements selected from the group consisting of Ti, V, Cr, Zr, Nb, Mo, Hf, Ta, W, or Y in a solvent as ions. By this producing method, a conductive film containing the transition element can be produced.

A second method for producing a conductive film of present embodiment (second producing method), the method includes:

(a2) preparing a MAX phase, the MAX phase represented by:

$M_mAX_n$ wherein M is at least one metal of Group 3, 4, 5, 6, or 7, X is a carbon atom, a nitrogen atom, or a combination thereof, A is at least one element of Group 12, 13, 14, 15, or 16, n is 1 to 4, and m is more than n and 5 or less;

(b2) performing an etching treatment of removing at least a part of the A atoms from the MAX phase by using an etching liquid to obtain an etched product;

(c2) performing an intercalation treatment of a monovalent metal ion including a step of mixing the etched product and a metal compound containing a monovalent metal ion to produce an intercalated product;

(d2) performing a transition element intercalation treatment including a step of mixing the intercalated product with a solution containing one or more transition elements selected from the group consisting of Ti, V, Cr, Zr, Nb, Mo, Hf, Ta, W, or Y in a solvent as ions to obtain a transition element intercalated product; and (e2) obtaining a conductive film by at least partially removing the solvent from the transition element intercalated product. Also by this producing method, a conductive film containing the transition element can be produced.

Hereinafter, each step of the first producing method and the second producing method will be described in detail. First, the first producing method will be described.

[First Producing Method]

Step (a1)

A predetermined dried MXene film is prepared as a precursor film. The production of the precursor film is not limited, and for example, when a precursor film is obtained by spraying a slurry containing MXene (particles) in a liquid medium, the precursor film can be produced by the following method.

First, particles (MXene particles) of a predetermined layered material are prepared. Such MXene particles can be synthesized by selectively etching (removing and optionally layer-separating) A atoms (and optionally parts of M atoms) from a MAX phase. The MAX phase is represented by the following formula:

$M_mAX_n$ (wherein M, X, n, and m are as described above, and A is at least one element of Group 12, 13, 14, 15, or 16, is usually a Group A element, typically Group IIIA and Group IVA, more specifically, may include at least one selected from the group consisting of Al, Ga, In, Tl, Si, Ge, Sn, Pb, P, As, S, or Cd, and is preferably Al), and has a crystal structure in which a layer formed of A atoms is located between two layers (each X may have a crystal lattice located within an octahedral array of M) represented by $M_mX_n$. When typically m=n+1, but not limited thereto, the MAX phase includes repeating units in which each one layer of X atoms is disposed in between adjacent layers of n+1 layers of M atoms (these are also collectively referred to as an "$M_mX_n$ layer"), and a layer of A atoms ("A atom layer") is disposed as a layer next to the (n+1)th layer of M atoms.

The MAX phase can be produced by a known method. For example, a TiC powder, a Ti powder, and an Al powder are mixed in a ball mill, and the obtained mixed powder is calcined under an Ar atmosphere to obtain a calcined body (block-shaped MAX phase). Thereafter, the calcined body obtained is pulverized by an end mill to obtain a powdery MAX phase for the next step.

A atoms (and optionally some of M atoms) are selectively etched (remove and optionally layer separation) from the MAX phase to remove the A atom layer (and optionally some of M atoms). Then, the surface of the exposed $M_mX_n$ layer is modified by hydroxyl groups, fluorine atoms, chlorine atoms, oxygen atoms, hydrogen atoms, and the like, existing in an etching liquid (usually, an aqueous solution of a fluorine-containing acid is used, but not limited thereto), so that the surface is terminated.

The etching can be carried out using an etching liquid containing $F^-$, and a method using, for example, a mixed liquid of lithium fluoride and hydrochloric acid, a method using hydrofluoric acid, or the like may be used. The etching liquid contains a metal compound containing monovalent metal ions, as in step (b2) of the second producing method described later, and intercalation treatment of monovalent metal ions may be performed simultaneously with the above etching. In this case, the content of the metal compound containing monovalent metal ions in the etching liquid and the like can be the same as in step (b2) of the second producing method described later.

After etching, the layer separation (delamination, separating multilayer MXene into single-layer MXene) of MXene may be promoted by any appropriate post-treatment (for example, ultrasonic treatment, handshaking, automatic shaker, or the like) as appropriate. For example, an intercalation treatment of monovalent metal ions including a step of mixing the etched product obtained by the etching treatment with a metal compound containing monovalent metal ions may be performed under the same conditions as in step (c2) of the second producing method described later. Since the shear force of an ultrasonic treatment is too large so that the MXene can be destroyed, it is desirable to apply appropriate shear force by handshake, an automatic shaker or the like, when it is desired to obtain a two-dimensional MXene (preferably single-layer MXene) having a larger aspect ratio.

When a precursor film is obtained by spraying, first, a slurry S containing MXene (particles) in a liquid medium is prepared. The concentration of the particles of the layered material in the slurry S may be, for example, 5 mg/mL or more, but in particular can be 30 mg/mL or more without causing nozzle clogging, since the agglomeration/overlap of the particles can be released and optionally the layers can be separated. As the concentration of the particles of the layered material in the slurry S is higher, the film having a desired thickness can be produced in a shorter time, and is suitable for industrial mass production. The upper limit of the concentration of the particles of the layered material can be appropriately selected, but can be, for example, 200 mg/mL or less. The concentration of the layered material is understood as a solid content concentration in the slurry S, and the solid content concentration can be measured using, for example, a heating dry weight measurement method, a freeze dry weight measurement method, a filtration weight measurement method, or the like.

The slurry S may be a dispersion and/or a suspension containing the particles 10a and 10b of the layered material in a liquid medium. The liquid medium may be an aqueous medium and/or an organic medium, and is preferably an aqueous medium. The aqueous medium is typically water, and in some cases, other liquid substances may be contained in a relatively small amount (for example, 30 mass % or less, preferably 20 mass % or less based on the whole mass of aqueous medium) in addition to water. The organic medium may be, for example, N-methylpyrrolidone, N-methylformamide, N,N-dimethylformamide, ethanol, methanol, dimethylsulfoxide, ethylene glycol, acetic acid, or the like.

Using the slurry S thus prepared, spraying is performed as described below to produce a precursor film. The precursor film may or may not substantially contain liquid components derived from the liquid medium of the slurry S. The precursor film may not contain a so-called binder.

Figure 4:
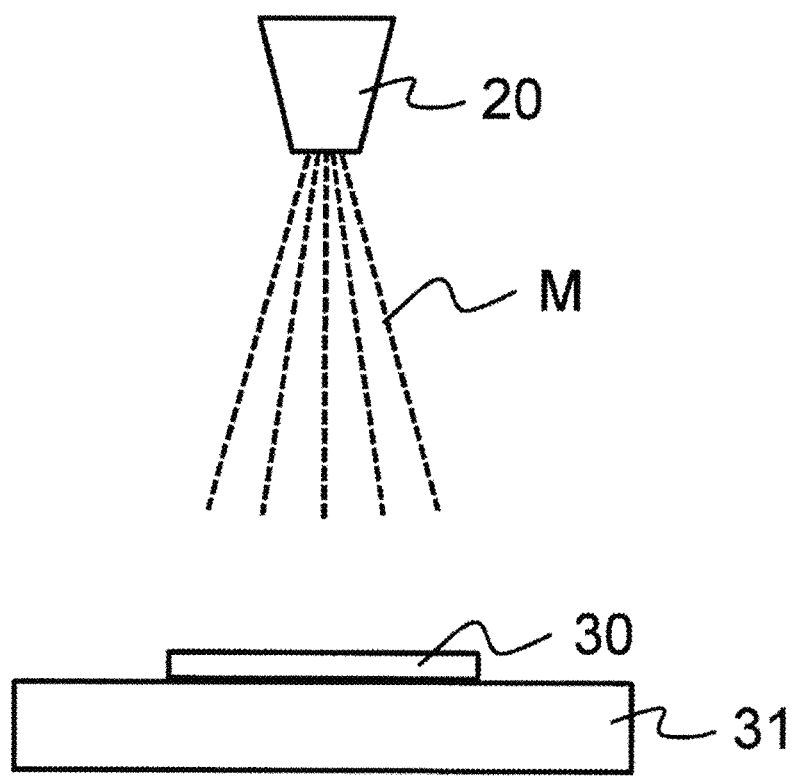
FIG. 4 is a schematic cross-sectional view illustrating one external mixing type multi-fluid nozzle that can be used to prepare a precursor film in a producing method of the present invention.

A method for separately discharging a slurry (fluid) containing the particles of the layered material in a liquid medium and a gas (another fluid) from a nozzle 20, allowing the slurry and the gas to collide with each other (thereby being mixed) outside the nozzle 20, and depositing the particles of the layered material on a substrate 31 to form the precursor film 30 will be described referring to FIG. 4.

Figure 5:
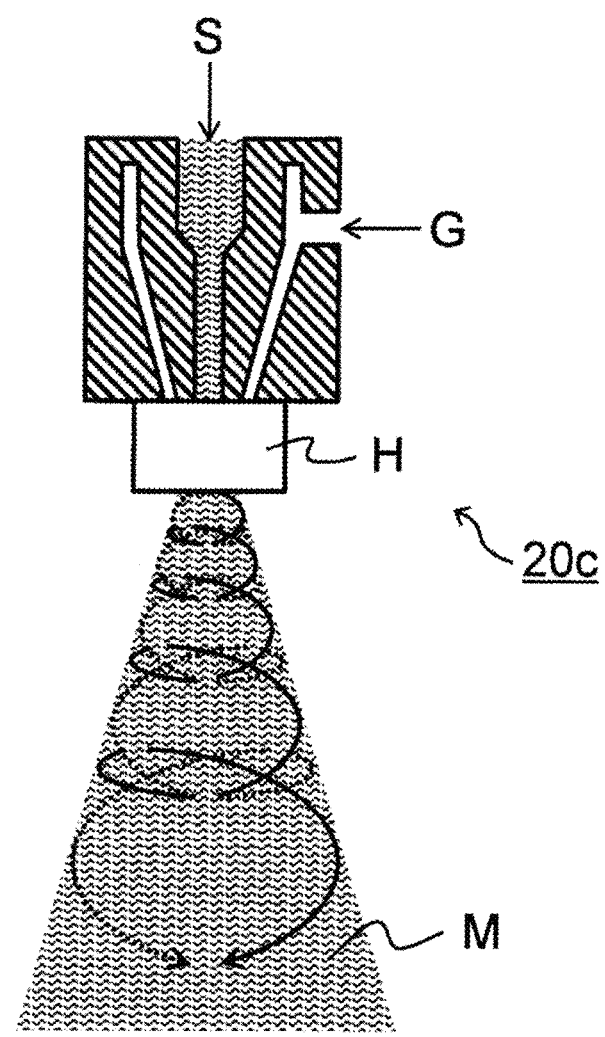
FIG. 5 is a schematic cross-sectional view illustrating another external mixing type multi-fluid nozzle that can be used to prepare a precursor film in a producing method of the present invention.

More specifically, the nozzle 20 available in the present embodiment is a nozzle referred to as an external mixing type multi-fluid nozzle. FIG. 5 illustrates an example of the external mixing type multi-fluid nozzle. As described in this example, the nozzle 20 preferably has a configuration in which the slurry and the gas collide with each other in a vortex outside the nozzle 20.

Referring to FIG. 5, the external mixing type multi-fluid nozzle 20c is an external mixing vortex type multi-fluid nozzle having a configuration in which the slurry S and the gas G collide with each other in a vortex outside the nozzle 20c. More specifically, the external mixing type multi-fluid nozzle 20c has a head portion H configured to discharge the slurry S and allow it to collide with the gas G separately discharged as a vortex (preferably a high-speed swirling vortex). For example, by using the nozzle 20c, a mist M containing the particles of the layered material can be sprayed from the mixed fluid of the slurry S and the gas G as follows. In the nozzle 20c, the gas G is passed through one or more spiral grooves (not shown) provided in a swirling member (not shown) incorporated in the head portion H and discharged from a gas discharge port (not shown), whereby a high-speed swirling vortex of the gas G is generated. The slurry S is introduced into a fluid supply pipe inside the nozzle 20c provided for the slurry S by the negative pressure of the high-speed swirling vortex by the gas G, and is discharged from the fluid discharge port (not shown) at a tip of the fluid supply pipe. Then, in front of the head portion H of the nozzle 20c, the slurry S discharged from the fluid discharge port collides with the high-speed swirling vortex caused by the gas G discharged from the gas discharge port (the slurry is atomized). The mixed fluid (including atomized slurry) formed in front of the head portion H is sprayed from the nozzle 20c as the mist M containing the particles of the layered material. Such an external mixing type multi-fluid nozzle 20c may be an external mixing vortex type multi-fluid nozzle (for example, Atomax nozzle available from ATOMAX.INC) or the like.

In this manner, the slurry S containing the particles of the layered material in the liquid medium and the gas G are separately discharged from the nozzle 20c by the nozzle 20c and collided with each other outside the nozzle 20c, whereby the slurry S can be made into an extremely fine and homogeneous mist M, and strong shear force can be applied to the particles of the layered material. As a result, when the particles of the layered material are aggregated, the aggregation can be released, and when the particles of the layered material are overlapped with each other, the overlap can be released. Further/alternatively, in a case where the particles are particles having a multilayer structure, layer separation (delamination) can be performed.

The slurry S may be supplied to the nozzle 20c by either a pressurization method or a suction method.

The gas G is not particularly limited, and may be, for example, air, nitrogen gas, or the like. The pressure of the gas G can be appropriately set, and may be, for example, 0.05 to 1.0 MPa (gauge pressure).

The particle size of the mist M can be appropriately adjusted, and may be, for example, 1 μm to 15 μm.

The mist M sprayed from the nozzle 20 is supplied (applied) onto the surface of the substrate 31 (spray coating), and particles of a layered material are deposited on the substrate 31 to form the precursor film 30. The liquid components contained in the mist M (derived from the liquid medium of the slurry S) may be at least partially, preferably entirely, removed by drying while and/or after being fed onto the substrate 31.

The substrate is not particularly limited, and may be made of any suitable material. The substrate may be, for example, a resin film, a metal foil, a printed wiring board, a mounted electronic component, a metal pin, a metal wiring, a metal wire, or the like.

Drying may be performed under mild conditions such as natural drying (typically, it is disposed in an air atmosphere at normal temperature and normal pressure.) or air drying (blowing air), or may be performed under relatively active conditions such as hot air drying (blowing heated air), heat drying, and/or vacuum drying.

The spraying and drying from the nozzle 20 may be appropriately repeated until a desired film thickness is obtained. For example, a combination of spraying and drying may be repeated a plurality of times. However, according to the embodiment, since a slurry containing the MXene particles 10a and/or 10b at a relatively high concentration can be used, a relatively thick film (for example, a thickness of 0.5 μm or more) can be obtained only by performing one spray (and optionally drying), and the number of sprays (and optionally drying) performed until a desired film thickness is obtained can be reduced.

As a result, a precursor film is produced as the precursor film 30. The precursor film 30 includes the particles 10a and/or 10b of layered material and may or may not substantially contain liquid components derived from the liquid medium of the slurry S. The precursor film 30 does not contain a so-called binder.

In addition to the preparation of the precursor film by the spraying, the precursor film may be prepared by subjecting the slurry or the supernatant containing MXene particles obtained by the delamination to suction filtration. The precursor film by spraying may be prepared using a nozzle other than the external mixing type multi-fluid nozzle.

Step (b1)

The precursor film is coated with a solution containing one or more transition elements selected from the group consisting of Ti, V, Cr, Zr, Nb, Mo, Hf, Ta, W, or Y in a solvent as ions.

In the preparation of a solution containing the transition element in a solvent as ions, a compound containing the transition element can be used. As the compound, for example, it is preferable to use one or more inorganic acid salts selected from the group consisting of sulfate, nitrate, acetate, or phosphate of the transition element. More preferably, the inorganic acid salt is one or more of sulfate and acetate. The concentration of the compound contained in the solution is not particularly limited, and can be, for example, in the range of 0.001 M to 0.1 M. When the sulfate is used, the concentration of the compound contained in the solution is preferably in the range of 0.001 M to 0.1 M. When the acetate is used, the concentration of the compound contained in the solution is preferably in the range of 0.01 M to 0.1 M. Examples of the counter anion source include the inorganic acid salt, but acid may not be essential. As the solvent, an organic solvent such as water (for example, distilled water, purified water such as deionized water, and the like), a lower alcohol (for example, ethanol, isopropanol, and butanol) having about 2 to 4 carbon atoms, hexane, or acetone can be used, and water is preferable.

Examples of the coating include commonly used coating methods such as immersion, brush, roller, roll coater, air spray, airless spray, curtain flow coater, roller curtain coater, die coater, and electrostatic coating.

The step after the coating is not particularly limited, and for example, the coating treatment by immersion is lifted from the solution, washed with water, dried, for example, dried at 70° C. to 90° C. for 1 to 2 hours, and further dried at 120° C. to 160° C.

[Second Producing Method]

Step (a2)

First, a MAX phase is obtained in the same manner as in the step (a1) of the first producing method.

The MAX phase can be produced by a known method. For example, a TiC powder, a Ti powder, and an Al powder are mixed in a ball mill, and the obtained mixed powder is calcined under an Ar atmosphere to obtain a calcined body (block-shaped MAX phase). Thereafter, the calcined body obtained is pulverized by an end mill to obtain a powdery MAX phase for the next step.

Step (b2)

An etching treatment is performed to remove at least some A atoms from the MAX phase using an etching liquid. The etching treatment is not particularly limited, and known conditions can be adopted. For example, the etching can be carried out using an etching liquid containing $F^-$, and a method using, for example, a mixed liquid of lithium fluoride and hydrochloric acid, a method using hydrofluoric acid, or the like may be used. The etching liquid may contain a metal compound containing monovalent metal ions, and the intercalation treatment of monovalent metal ions may be performed simultaneously with the etching instead of the following step (c2) or together with the following step (c2). In this case, the content of the metal compound containing monovalent metal ions in the etching liquid is preferably 0.001 mass % or more. The content is more preferably 0.01 mass % or more, and still more preferably 0.1 mass % or more. On the other hand, from the viewpoint of dispersibility in a solution, the content of the metal compound containing a monovalent metal ion in the etching liquid is preferably 10 mass % or less, and more preferably 1 mass % or less.

Step (c2)

The intercalation treatment of monovalent metal ions including a step of mixing the etched product obtained by the etching treatment with a metal compound containing monovalent metal ions may be performed. Examples of the monovalent metal ions constituting the metal compound containing the monovalent metal ions include alkali metal ions such as a lithium ion, a sodium ion, and a potassium ion, a copper ion, a silver ion, and a gold ion. Examples of the metal compound containing a monovalent metal ion include an ionic compound in which the metal ion and a cation are bonded. Examples of the ionic compound including the metal ions include an iodide, a phosphate, a sulfide salt including a sulfate, a nitrate, an acetate, and a carboxylate. As described above, the monovalent metal ion is preferably a lithium ion, and the metal compound containing a monovalent metal ion is preferably a metal compound containing a lithium ion, more preferably an ionic compound of a lithium ion, and still more preferably one or more of an iodide of a lithium ion, a phosphate of a lithium ion, and a sulfide salt of a lithium ion. When a lithium ion is used as the metal ion, it is considered that water hydrated to the lithium ion has the most negative dielectric constant, and thus it is easy to form a single layer.

The content of the metal compound containing a monovalent metal ion in the formulation for the intercalation treatment of a monovalent metal ion is preferably 0.001 mass % or more. The content is more preferably 0.01 mass % or more, and still more preferably 0.1 mass % or more. On the other hand, from the viewpoint of dispersibility in a solution, the content of the metal compound containing a monovalent metal ion is preferably 10 mass % or less, and more preferably 1 mass % or less.

After the mixing, stirring may be performed or the mixture may be allowed to stand. Examples of the stirring method include a method using a stirring bar such as a stirrer, a method using a stirring blade, a method using a mixer, and a method using a centrifugal device.

Step (d2)

The intercalated product of monovalent metal ions obtained by the intercalation treatment of monovalent metal ions is mixed with a solution containing one or more transition elements selected from the group consisting of Ti, V, Cr, Zr, Nb, Mo, Hf, Ta, W, or Y in a solvent as ions. The kind, concentration, and the like of the compound of the transition element contained in the solution are as described in the step (b1) of the first producing method. After the mixing, stirring may be performed or the mixture may be allowed to stand. Examples of the stirring method include a method using a stirring bar such as a stirrer, a method using a stirring blade, a method using a mixer, and a method using a centrifugal device.

Step (e2)

The solvent is at least partially removed from the transition element intercalated product obtained by the transition element intercalation treatment to obtain a conductive film. The method for at least partially removing the solvent is not particularly limited, and examples thereof include filtration, heating, and distillation under reduced pressure. For example, suction filtration of a supernatant or clay obtained after washing the transition element intercalated product with water can be mentioned. After the filtration, vacuum drying is performed at 80° C. for 24 hours so as to prepare a conductive film. As a filter for suction filtration, for example, a membrane filter (Durapore, manufactured by Merck KGaA, pore size 0.45 μm) can be used.

Although the conductive film and the producing method thereof in the embodiment of the present invention have been described in detail above, various modifications are possible. It should be noted that the conductive film according to the present invention may be produced by a method different from the producing method in the above-described embodiment, and the method for producing a conductive film of the present invention is not limited only to one that provides the conductive film according to the above-described embodiment.

EXAMPLES

[Production of Transition Element-Containing MXene Film]

Example 1

In Example 1, a Ti ion-supported MXene film was prepared as a sample (conductive film).
(Formation of Precursor Film)
Preparation of Slurry $Ti_3AlC_2$ particles were prepared as MAX particles by a known method. These $Ti_3AlC_2$ particles (powder) were added to 9 mol/L hydrochloric acid together with LiF (for 1 g of $Ti_3AlC_2$ particles, 1 g of LiF and 10 mL of 9 mol/L hydrochloric acid were used.), and stirred with a stirrer at 35° C. for 24 hours to obtain a solid-liquid mixture (suspension) containing a solid component derived from the $Ti_3AlC_2$ particles.

The solid-liquid mixture (suspension) was subjected to an operation of separating and removing a supernatant liquid by washing with pure water and decantation using a centrifuge (remaining precipitate excluding the supernatant is washed again) was repeated about 10 times. Then, the mixture obtained by adding pure water to the precipitate was stirred with an automatic shaker for 15 minutes, and then subjected to centrifugal separation operation for 5 minutes with a centrifuge to separate the mixture into a supernatant and a precipitate, and the supernatant was separated and removed by centrifugal dehydration. As a result, dilution was performed by adding pure water to the remaining precipitate excluding the supernatant, thereby obtaining a crude purification slurry.

It is understood that the roughly purified slurry may contain, as MXene particles, single-layer MXene and multilayer MXene that are not formed into a single layer due to insufficient layer separation (delamination), and may further contain impurities other than MXene particles (crystals of unreacted MAX particles and by-products derived from etched A atoms (for example, crystals of $AlF_3$), and the like).

The roughly purified slurry obtained above was placed in a centrifuge tube, and centrifuged with relative centrifugal force (RCF) of 2,600×g for 5 minutes using a centrifuge. The supernatant thus centrifuged was recovered to obtain a purified slurry. It is understood that the purified slurry contains a large amount of single-layer MXene as MXene particles. The remaining precipitate, excluding the supernatant, was not subsequently used.

The purified slurry obtained above was placed in a centrifuge tube, and centrifuged with the RCF of 3,500×g for 120 minutes using a centrifuge. The supernatant thus centrifuged was separated and removed. The separated and removed supernatant was not used thereafter. A clay-like substance (clay) was obtained as the remaining precipitate from which the supernatant was removed. As a result, a $Ti_3C_2T_s$-water dispersion clay was obtained as a MXene clay. The MXene clay and pure water were mixed in appropriate amounts to prepare an MXene water dispersion having an MXene solid content concentration of 75 mg/mL.
Formation of Precursor Film by Filtration 10 mL of the MXene water dispersion (MXene solid content concentration: 75 mg/mL) was diluted with pure water to 15 mg/mL to obtain a water dispersion having a total volume of 50 mL. Thereafter, 5 mL of the water dispersion having a MXene solid content concentration of 15 mg/mL was taken with a dropper and subjected to suction filtration overnight. A membrane filter (pore size 0.45 μm, Durapore manufactured by Merck KGaA) was used for the filtration. The filtrate obtained by suction filtration was then dried in a vacuum oven at 80° C. overnight to obtain a filtered MXene film as a precursor film.
Formation of Precursor Film by Spraying As another precursor film (MXene film), an MXene spray film was prepared as follows. As an external mixing type multi-fluid nozzle, an external mixing vortex type multi-fluid (two-fluid) nozzle (available from ATOMAX.INC, Atomax Nozzle AM 12 type) was used. The slurry (solid content concentration: 84 mg/mL) prepared above was placed in a plastic syringe and set in a syringe pump (YSP-101 available from YMC CO., LTD.). The extrusion speed of the syringe pump was set to 5.0 mL/min, and the discharge port of the plastic syringe was connected to the liquid material (slurry) supply port of the external mixing type multi-fluid nozzle. On the other hand, the gas supply port of the external mixing type multi-fluid nozzle was connected to a supply source of compressed air (factory compressed air line) via a plastic hose, and the gas discharge pressure from the nozzle was adjusted to 0.45 MPa (gauge pressure).

Thereafter, the MXene solid content concentration of 15 mg/mL water dispersion and gas (air) were discharged from an external mixing type multi-fluid nozzle, and sprayed onto the surface of a substrate made of gold coated glass (manufactured by WAKI COMPANY JAPAN CO., LTD.). After spraying, it was dried overnight in a vacuum oven at 80° C. to obtain a spray MXene film as a precursor film.
(Immersion in Transition Element-Containing Solution)

Next, 0.0384 g of a 25% aqueous solution of titanium (IV) sulfate (manufactured by Kishida Chemical Co., Ltd.) was weighed, and diluted with pure water to 20 mL to prepare a 0.002 M titanium sulfate aqueous solution. The filtration MXene film and the spray MXene film prepared as described above were each immersed in 20 mL of the prepared 0.002 M titanium sulfate aqueous solution, and left at room temperature for 24 hours. After 24 hours, the filtration MXene film and the spray MXene film were taken out from the titanium sulfate aqueous solution, left to dry at room temperature for another 3 days, and then dried in a vacuum oven at 80° C. overnight to obtain a sample (conductive film) of Example 1.

Example 2

In Example 2, a Cr ion-supported MXene film was prepared as a sample (conductive film).
(Formation of Precursor Film)

A spray MXene film was obtained as a precursor film in the same manner as in Example 1 except that a substrate formed of a polyimide film (manufactured by DU PONT-TORAY CO., LTD.) was sprayed in the formation of the precursor film by spraying in Example 1.
(Immersion in Transition Element-Containing Solution)

Next, 1.146 g of chromium (III) acetate (produced by FUJIFILM Wako Pure Chemical Corporation) was weighed, and diluted with pure water to 50 mL to prepare a 0.1 M chromium acetate aqueous solution. The spray MXene film prepared as described above was immersed in 50 mL of the prepared 0.1 M aqueous chromium acetate solution, and allowed to stand at room temperature for 24 hours. After 24 hours, the spray MXene film was taken out from the 0.1 M aqueous chromium acetate solution, left at room temperature for another 1 day, and dried. Thereafter, the film was dried in an 80° C. normal pressure oven for 1 hour and further dried at 150° C. for 30 minutes to obtain a sample (conductive film) of Example 2.

Example 3

In Example 3, a Y ion-supported MXene film was prepared as a sample (conductive film).
(Formation of Precursor Film)

A spray MXene film was obtained as a precursor film in the same manner as in Example 1 except that a substrate formed of a polyimide film (manufactured by DU PONT-TORAY CO., LTD.) was sprayed in the spray coating in Example 1.
(Immersion in Transition Element-Containing Solution)

Next, 1.691 g of yttrium acetate tetrahydrate (III) (manufactured by FUJIFILM Wako Pure Chemical Corporation) was weighed, and diluted with pure water to 50 mL to prepare a 0.1 M yttrium acetate aqueous solution. The spray MXene film prepared as described above was immersed in 50 mL of the prepared 0.1 M yttrium acetate aqueous solution, and allowed to stand at room temperature for 24 hours. After 24 hours, the spray MXene film was taken out from the 0.1 M yttrium acetate aqueous solution, left at room temperature for another 1 day, and dried. Thereafter, the film was dried in an 80° C. normal pressure oven for 1 hour and further dried at 150° C. for 30 minutes to obtain a sample (conductive film) of Example 3.

In Examples 1 to 3, the precursor film (MXene film) was immersed in an aqueous solution containing a transition element to obtain a transition element ion-supported MXene film, but the method for producing a transition element ion-supported MXene film is not limited thereto, and a transition element ion-supported MXene film may be obtained by mixing a monovalent metal ion intercalated product and a transition element ion-containing solution to perform a transition element intercalation treatment, and then at least partially removing the solvent from the transition element intercalated product by, for example, filtration or the like.

Comparative Example 1

In Comparative Example 1, an Al ion-supported MXene film was prepared as a sample.

First, as a precursor film, a filtration MXene film and a spray MXene film were obtained in the same manner as in Example 1.

Next, 0.0150 g of aluminum nitrate nonahydrate (manufactured by FUJIFILM Wako Pure Chemical Corporation) was weighed and dissolved in 20 mL of pure water to prepare a 0.002 M aluminum nitrate aqueous solution. The filtration MXene film and the spray MXene film prepared as described above were immersed in 20 mL of the prepared 0.002 M aluminum nitrate aqueous solution, and left at room temperature for 24 hours. After 24 hours, the filtration MXene film and the spray MXene film were taken out from the aluminum nitrate aqueous solution, left to dry at room temperature for another 3 days, and then dried in a vacuum oven at 80° C. overnight to obtain a sample of Comparative Example 1.

Comparative Example 2

In Comparative Example 2, an ion-unsupported MXene film (precursor film) was prepared as a sample.

As a precursor film, a filtration MXene film and a spray MXene film were obtained in the same manner as in Example 1. In Comparative Example 2, the filtration MXene film and the spray MXene film were not immersed in the transition element-containing solution, and the filtration MXene film and the spray MXene film, that is, the precursor film were used as samples of Comparative Example 2. In the following evaluation, Comparative Example 2 is referred to as Control.
[Evaluation of Transition Element-Containing MXene Film]
(Acceleration Test and Measurement of Electrical Conductivity)

Using samples of Examples 1 to 3 and Comparative Examples 1 and 2, initial conductivity was measured, and the stability of the conductivity was evaluated as follows.

Figure 6:
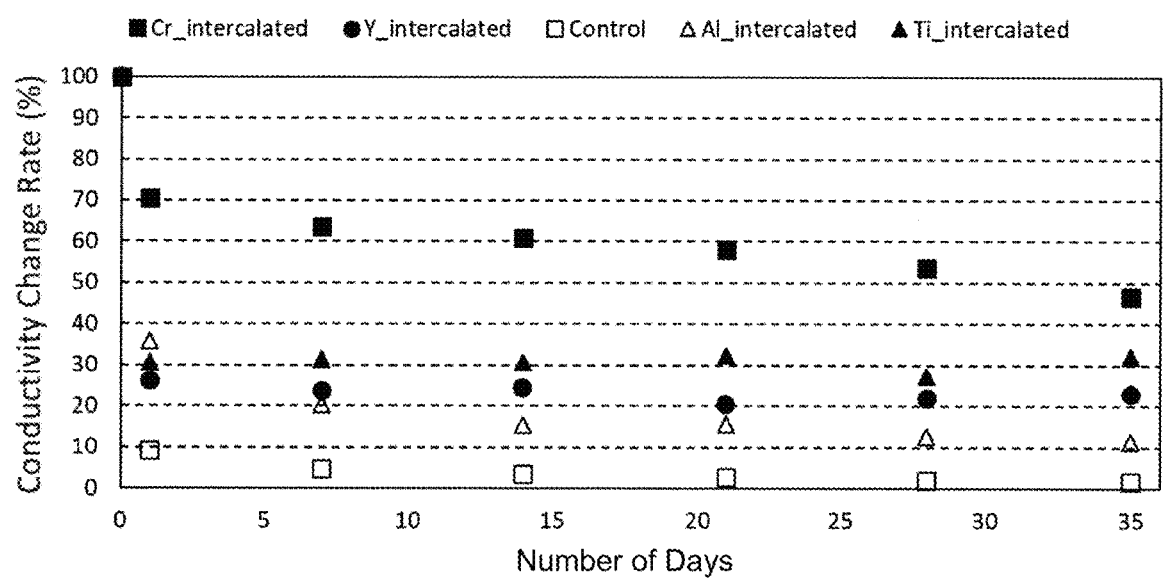
FIG. 6 is a graph of observation of a temporal change in the conductivity in Examples.

First, the sample was held in a state of being exposed to an environment of room temperature (about 25° C.) and humidity of 99%, the conductivity was measured one day after the start of holding, and thereafter, the conductivity was measured until the 5th week at an interval of one week from the start of holding. The conductivity was measured at three points including the vicinity of the center of the film per sample. For the measurement of the conductivity, a low resistivity meter (Loresta AX MCP-T370, manufactured by Mitsubishi Chemical Analytech) was used. A micrometer (MDH-25 MB, manufactured by Mitutoyo Corporation) was used for the thickness of the sample (dry film). FIG. 6 illustrates results showing changes over time in the conductivity of Examples 1, 2, and 5 and Comparative Examples 1 and 2. The "conductivity change rate" on the vertical axis in FIG. 6 is a rate (%) of the subsequent conductivity to the initial conductivity, where the initial conductivity is 100%. The initial conductivity was 6,044 S/cm in Example 1, 13,514 S/cm in Example 2, 15,707 S/cm in Example 3, 6,305 S/cm in Comparative Example 1, and 4,454 S/cm in Comparative Example 2.

From the results of FIG. 6, in Comparative Example 2 (control), which is the result of the MXene film (precursor film) without ion support, the conductivity after one day was significantly reduced from the initial conductivity, and thereafter, the conductivity was reduced and the stability of the conductivity was significantly poor. On the other hand, in Example 1, although the initial conductivity was high and the conductivity decreased after one day, the decrease in the conductivity was sufficiently suppressed as compared with Comparative Example 2, and the conductivity was stabilized. In addition, in Example 2 and Example 3, similarly to Example 1, although the initial conductivity was high and the conductivity decreased once, the decrease in the conductivity was sufficiently suppressed and the conductivity was stabilized as compared with Comparative Example 2. In the Cr ion-supported MXene film of Example 2 and the Y ion-supported MXene film of Example 3, similarly to the Ti ion-supported MXene film of Example 1, the layers of the MXene film were connected, and water molecules hardly entered, so that the conductivity was considered to be stable as described above.

On the other hand, in Comparative Example 1 in which Al ions different from the predetermined transition element were supported, the degree of decrease from the initial conductivity to the conductivity after one day was almost the same as that in Example 1, but the subsequent amount of decrease in the conductivity was large, and the stability of the conductivity was poor.

A spray MXene film (dry film) formed in the same manner as in Example 2 except that a 0.01 M chromium acetate aqueous solution or a 0.001 M chromium acetate aqueous solution was used instead of the 0.1 M chromium acetate aqueous solution in the immersion in the transition element-containing solution in Example 2 was also separately prepared, and the temporal change of the conductivity was measured. As a result, it was confirmed that the same tendency as in Example 2 was exhibited even when the transition element concentration in the transition element-containing solution used in the production of the spray MXene film was changed. In addition, a spray MXene film (dry film) formed in the same manner as in Example 3 except that a 0.01 M yttrium acetate aqueous solution or a 0.001 M yttrium acetate aqueous solution was used instead of the 0.1 M yttrium acetate aqueous solution in the immersion in the transition element-containing solution in Example 3 was also separately prepared, and the temporal change of the conductivity was measured. As a result, it was confirmed that the same tendency as in Example 3 was exhibited even when the transition element concentration in the transition element-containing solution used in the production of the spray MXene film was changed.

(Strength Evaluation)

Using a sample in which a spray MXene film was formed on the surface of a substrate made of gold-coated glass (manufactured by WAKI COMPANY JAPAN CO., LTD.) in Example 1 and Comparative Examples 1 and 2, the strength of the film of the sample was evaluated by performing a tape peeling test as follows.

Based on the standard (IPC-TM-650), a second tape peeling test was performed twice.

Figure 7A:
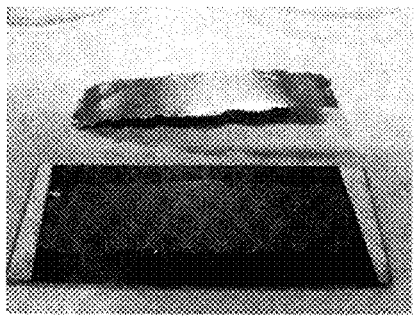

First, as a first tape peeling test, a 3 M Brand 600 ½ inch tape (manufactured by 3M Company) was prepared, peeled off in the first week of the roll-shaped tape, and used for the test from the second round. The tape was drawn out by 5 cm to stuck to the spray MXene film as a first tape, and the tape was brought into close contact with the spray MXene film so as to remove all air between the first tape and the spray MXene film. The first tape was pulled at once in a direction of about 90° from the spray MXene film, and the film state was observed. The tape was attached for 1 minute or less. The results are shown in FIG. 7. The photograph of FIG. 7 was taken with the substrate after the above test and the attached substance to the first tape peeled upward. FIG. 7(a) illustrates the results of Example 1, FIG. 7(b) illustrates the results of Comparative Example 1, and FIG. 7(c) illustrates the results of Comparative Example 2.

Further, as a second tape peeling test, a new tape was attached to the spray MXene film attached to the peeled tape in the same manner as described above, the new tape was peeled, and the film state was observed. The results are illustrated in FIG. 8. In the photograph of FIG. 8, the upper substrate is the same as the lower substrate of FIG. 7. In the lower part of the photograph of FIG. 8, among the tapes separated into the left and right, the left side indicates the back side (adhered substance) of the second tape, and the right side indicates the back side (adhered substance after the second tape peeling test) of the first tape. FIG. 8(a) illustrates the results of Example 1, FIG. 8(b) illustrates the results of Comparative Example 1, and FIG. 8(c) illustrates the results of Comparative Example 2.

From the results of FIG. 7(a), in Example 1, the spray MXene film was peeled off from the surface of the gold substrate, but from FIG. 8(a), which is the result of the tape peeling test again, the left side was almost only the stuck tape, and the spray MXene film remained stuck to the first tape on the right side. That is, peeling in the spray MXene film, that is, cohesive peeling did not occur. From this, it can be seen that the spray MXene film is reinforced by Ti ion support.

Figure 7B:
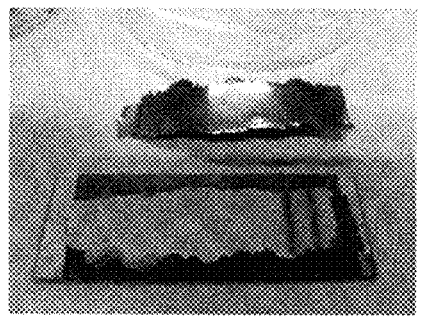
Figure 7C:
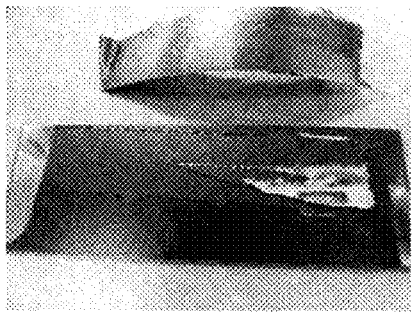
Figure 8A:
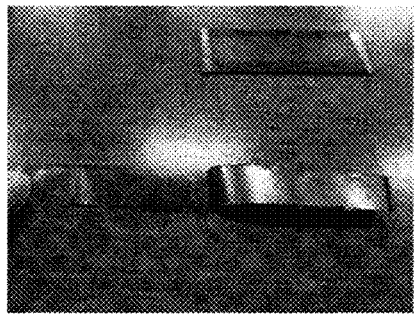
Figure 8B:
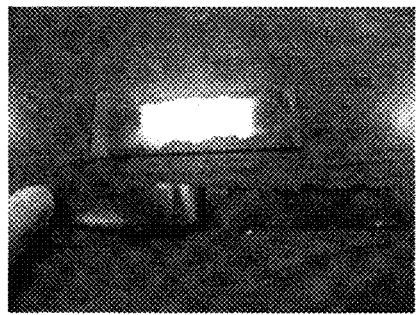
Figure 8C:
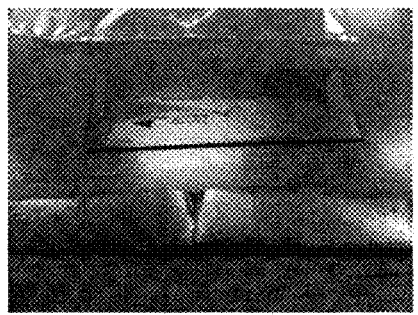

On the other hand, in Comparative Example 1, the adhesion between the gold slide glass (substrate) and the spray MXene film was weak, and a gold (gray in FIG. 7(b)) substrate was widely observed in the first tape peeling test. In Comparative Example 1, in the first tape peeling test, cohesive peeling that peeled off in the spray MXene film did not occur as in Comparative Example 2 described below, but in the second tape peeling test, the MXene film was transferred to the second tape on the left side, and cohesive peeling occurred.

In Comparative Example 2, since the adhesion between the gold slide glass (substrate) and the spray MXene film and the strength of the spray MXene film itself were weak, peeling from the substrate (the gold substrate was confirmed) in the first tape peeling test also caused cohesive peeling because a part of the spray MXene film remained. This indicates that the known MXene film has low strength.

(XRD Measurement)

Figure 9:
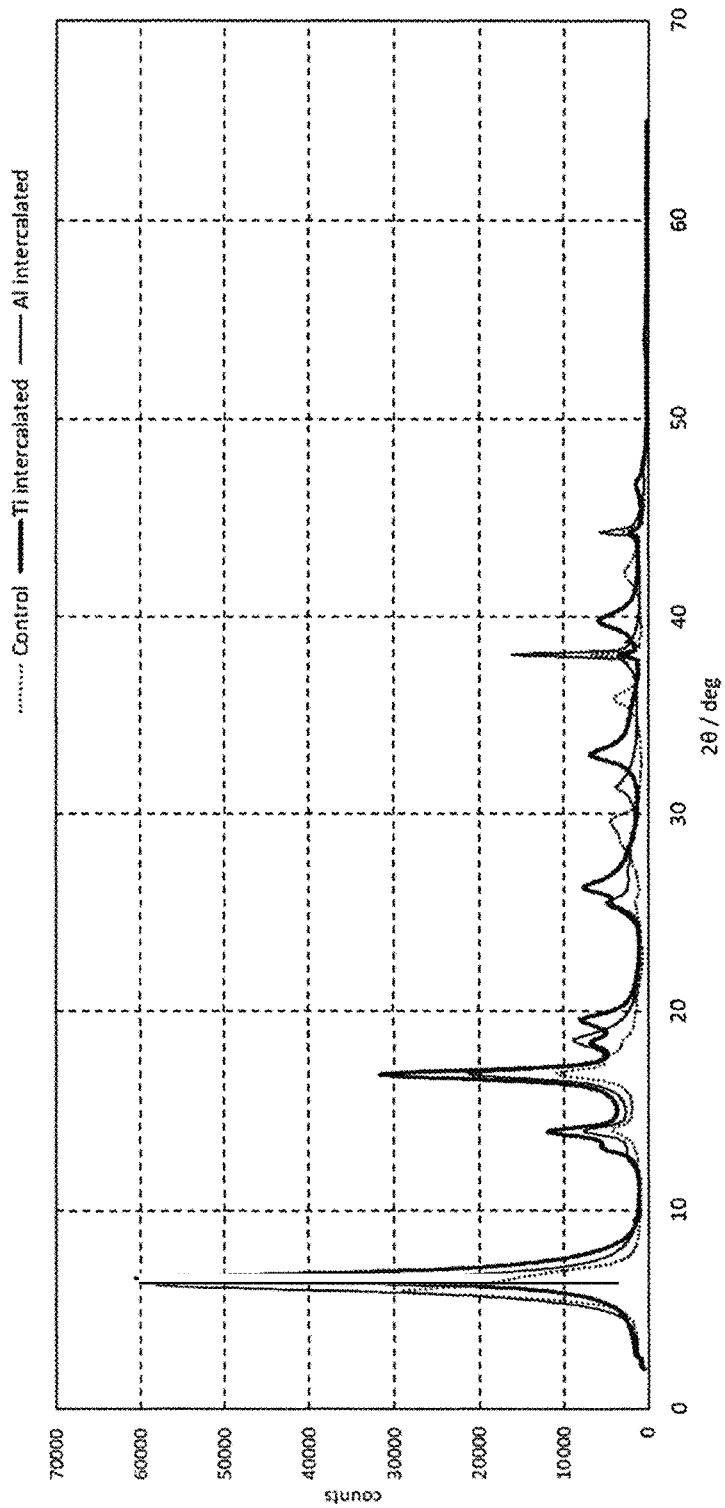
FIG. 9 is a diagram illustrating a XRD result of a spray MXene film in Examples.

The spray MXene films (dry films) of Example 1 and Comparative Examples 1 and 2 were subjected to the XRD measurement. More specifically, the XRD measurement of the spray MXene film was performed under the following conditions to obtain a two-dimensional X-ray diffraction image (profile) of the spray MXene film. As a result, FIG. 9, FIG. 10 in which the range from 2° to 9° in FIG. 9 is enlarged, and FIG. 11 in which the range from 35° to 55° in FIG. 9 is enlarged are illustrated.

Figure 10:
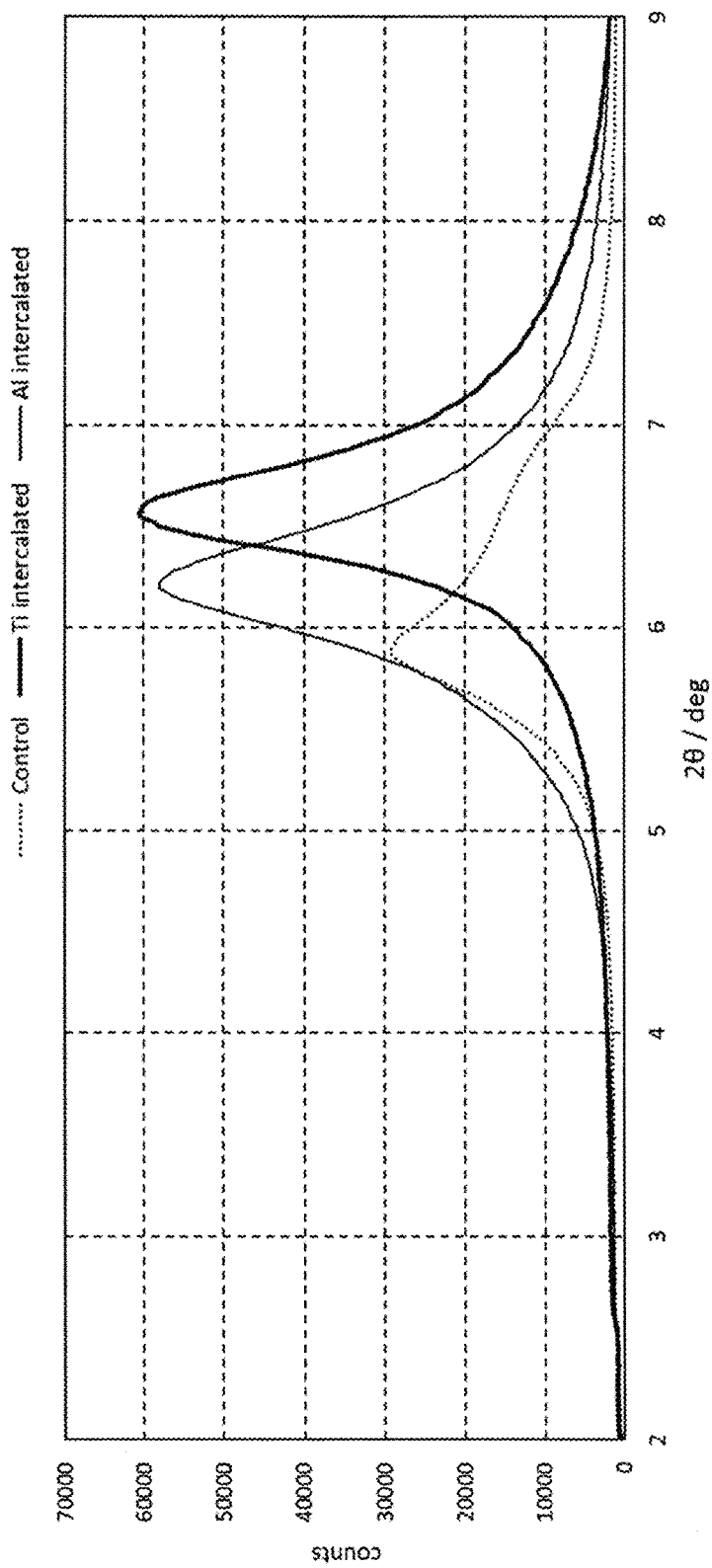
FIG. 10 is a diagram illustrating the XRD result of the spray MXene film in which a part (low angle side) of FIG. 9 is enlarged.
Figure 11:
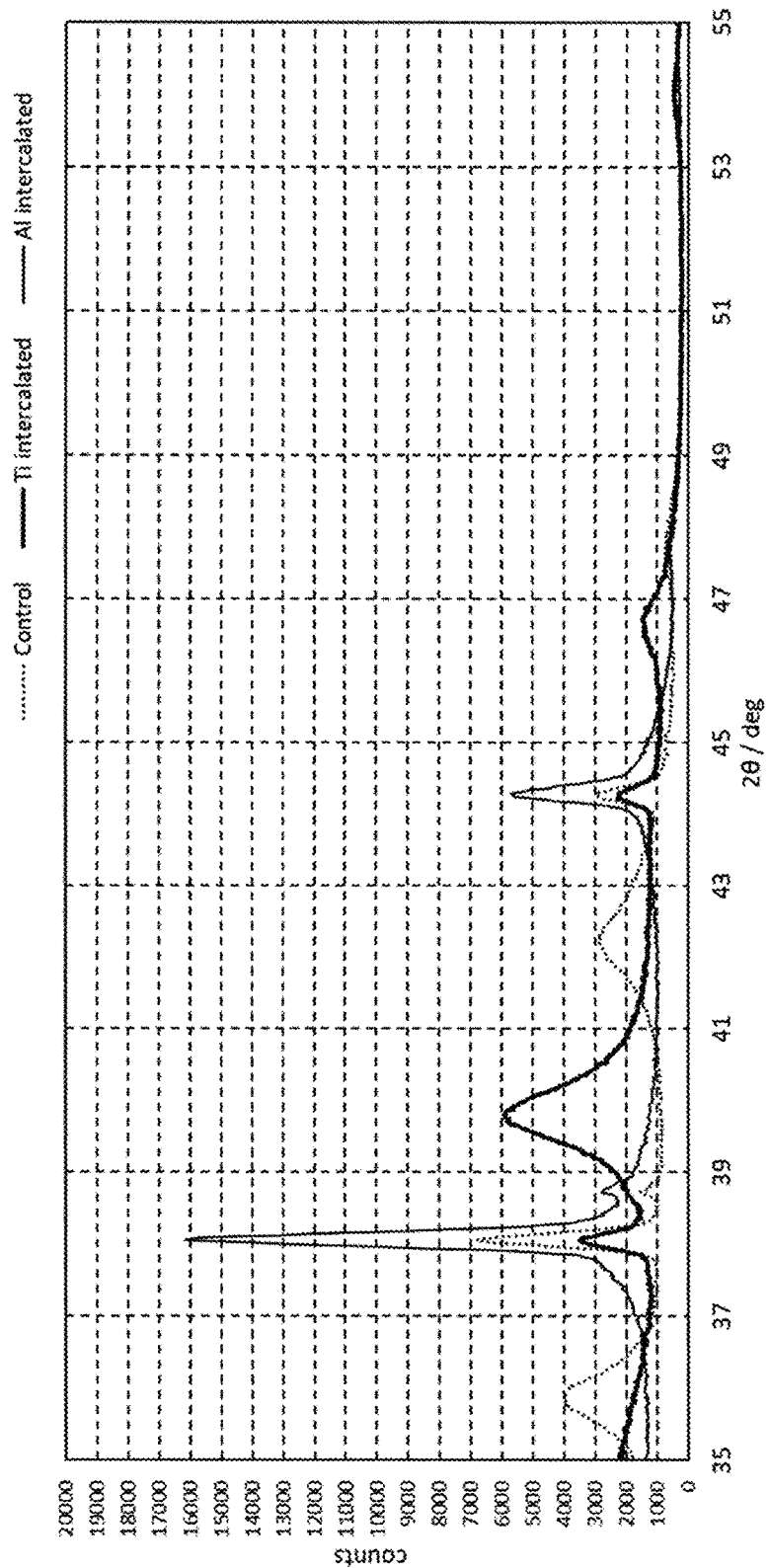
FIG. 11 is a diagram illustrating the XRD result of the spray MXene film in which another part (high angle side) of FIG. 9 is enlarged.

In the two-dimensional X-ray diffraction image (profile), the peak position of the (002) plane in the 6° to 10° range represents the distance (interlayer distance) between the nanosheets of the MXene film, and it is known that the interlayer distance of MXene decreases as the peak is located on the higher angle side. In FIG. 10, the Ti ion-supported MXene film had a peak on the higher angle side as compared with the precursor film without ion support. That is, it is considered that the nanosheets were connected by Ti ions, and the interlayer distance of MXene was narrowed. In addition, in the case of the Al ion-supported MXene film of Comparative Example 1, it is considered that the nanosheets were not connected as much as Ti, and the interlayer distance of MXene was wider than that of Ti.

(XRD Measurement Conditions)

Apparatus used: MiniFlex 600 produced by Rigaku Corporation

Conditions

Light source: Cu tube bulb

Characteristics X-ray: CuKα=1.54 Å

Measurement range: 2 degrees to 65 degrees

Step: 5 deg/min

Step width: 0.02 deg

Figure 12:
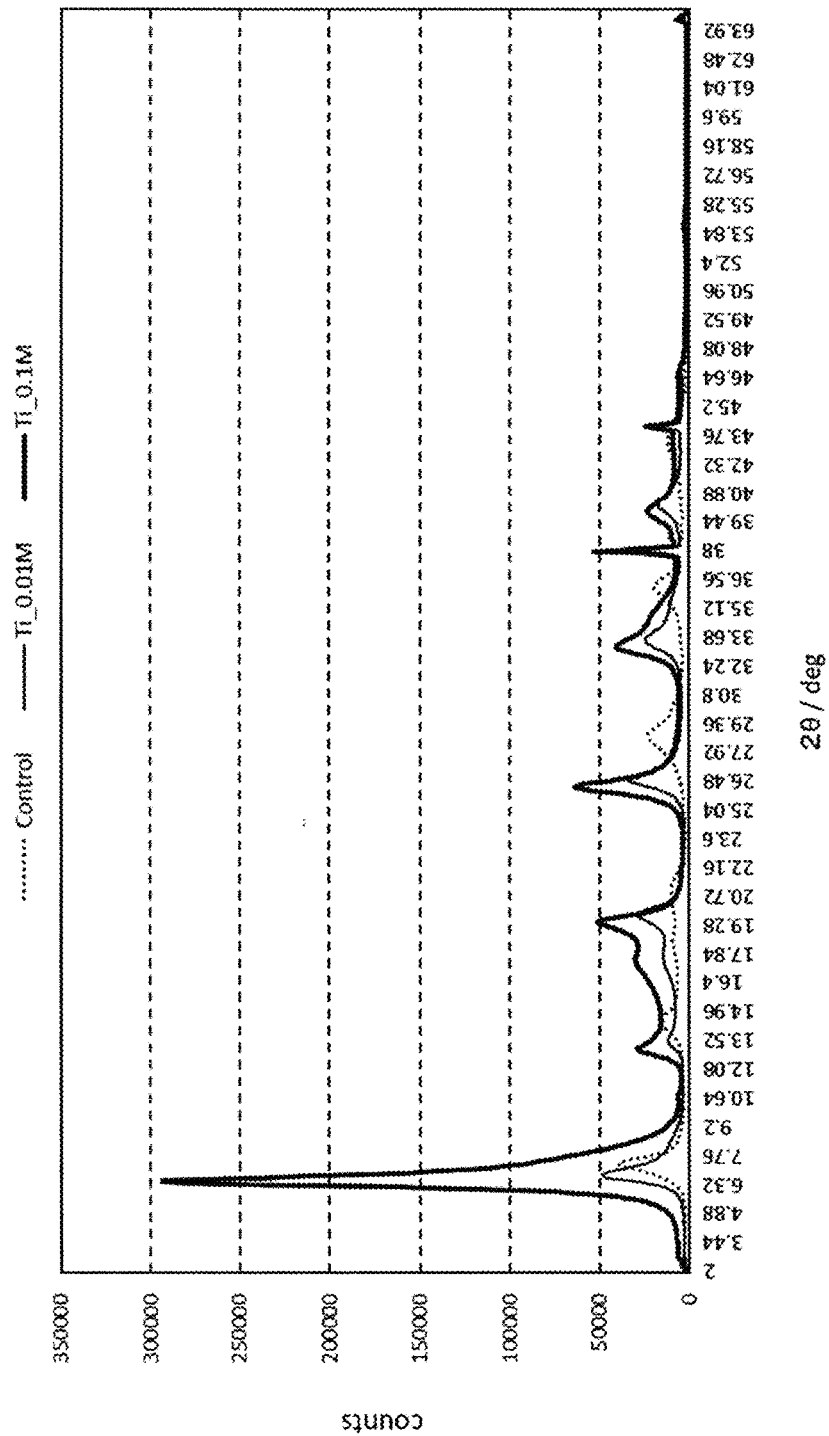
FIG. 12 is a diagram illustrating a XRD result of another spray MXene film in Examples.

A spray MXene film (dry film) formed in the same manner as in Example 1 except that a 0.01 M titanium sulfate aqueous solution or a 0.1 M titanium sulfate aqueous solution was used instead of the 0.002 M titanium sulfate aqueous solution in the immersion in the transition element-containing solution in Example 1 was also separately prepared, and the XRD measurement was performed. FIG. 12 illustrates a two-dimensional X-ray diffraction image (profile) as a result. From FIG. 12, the structure was hardly affected by the difference in the concentration of the transition element-containing solution at the time of manufacturing, and the two-dimensional X-ray diffraction image (profile) of the Ti ion-supported MXene film illustrated in FIG. 12 was almost the same as the two-dimensional X-ray diffraction image (profile) of the Ti ion-supported MXene film in FIG. 9.

(Immersion into Pure Water of Comparative Example 2)

When the sample of Comparative Example 2 was immersed into pure water, the sample was dispersed into an Indian ink state. This is considered to be because there is no material that retains MXene nanosheets in pure water.

The following can be said from these results. That is, as in the result of Example 1, it is considered that the conductivity was kept constant under high humidity because Ti ions entered between the MXene nanosheets and served as a bridge between the two nanosheets. It has been previously known that MXene is aggregated by ions, and this is considered to be due to the effect of connecting MXene nanosheets by Ti. More specifically, since the MXene nanosheets are electrostatically connected by Ti ions, the MXene nanosheets are less likely to spread and water is less likely to enter as compared with the precursor film. From the fact that the surface of the MXene nanosheets is said to be negatively charged, it is considered that Ti ions as cationic species retain the MXene nanosheets by electrostatic interaction. However, since a certain gap is formed between the MXene nanosheets due to the presence of Ti ions, water is absorbed by the gap, which is considered to be indicated by a decrease in the conductivity immediately after the accelerated test. Although a certain amount of water is absorbed, when comparing Example 1 doped with Ti ions and Comparative Examples 1 and 2 not doped with Ti ions, it is considered that the conductivity is suppressed to a certain value by the interfilm retention action of Ti ions. It is considered that the same action and effect are also exerted on the Cr ion-supported MXene film and the Y ion-supported MXene film.

On the other hand, in Comparative Example 1 in which Al ions were supported instead of Ti ions, as illustrated in FIG. 10, a peak appeared on a higher angle side than the precursor film but on a lower angle side than the Ti ion-supported MXene film. From this, even when Al ions were used, the nanosheets were connected and narrowed, but there was no effect of the MXene nanosheet retention function as much as Ti. As a result, it was confirmed that Comparative Example 1 also suppressed a decrease in conductivity due to moisture absorption and had film strength, but was inferior in performance to the Ti ion-supported MXene film. The reason why Comparative Example 1 did not have the effect of the MXene nanosheet retention function as much as Ti is considered to be that MXene tends to particularly interact with the d orbital of the metal as described above. That is, it is considered that Ti having a large number of electrons in the d orbital has a stronger interMXene retention force due to stronger interaction with π electrons of MXene as compared with Al, and thus contributes to improvement of moisture absorption resistance (stability of conductivity) and film strength, but Al was not able to secure a stronger interMXene retention force, and thus resulted in inferior moisture absorption resistance (stability of conductivity) and film strength.

In Comparative Example 2 as a precursor film, a peak appeared on the highest angle side. This suggests that metal ions did not intercalate, and water molecules were inserted to widen the layers. As a result, in Comparative Example 2, the MXene nanosheet holding function by the transition metal was not provided, the electrical conductivity was significantly reduced, and the film strength was the weakest.

This application claims priority based on Japanese Patent Application No. 2021-003543 which is a patent application filed in Japan. Japanese Patent Application No. 2021-003543 is incorporated herein by reference.

The conductive film of the present invention can be utilized for any suitable application, and can be particularly preferably used, for example, as an electrode or electromagnetic shield in an electric device, for example, a large-capacity capacitor, a battery, a low-impedance biosignal sensing electrode, a high-sensitivity sensor, and an antenna as an electrode, or for example, a high-shielding EMI shield as an electromagnetic shield.

EXPLANATION OF REFERENCE NUMBERS 1a, 1b Layer body ($M_mX_n$ layer)
3a, 5a, 3b, 5b Modifier or terminal T
7a, 7b, 7c, 7d MXene layer
10a, 10b, 10c MXene particles
10d transition element-containing MXene particles
20 Nozzle
20c External mixing type multi-fluid nozzle
30 Precursor film (MXene film)
31 Substrate
40 Water molecules
41 Ti ion
50 Titanium atom
51 Oxygen atom
S Slurry
G Gas
M Mist
H Head portion of nozzle

The invention claimed is:

1. A conductive film comprising:
particles of a layered material including one or plural layers, the one or plural layers including a layer body represented by:

$M_mX_n$ wherein M is at least one metal of Group 3, 4, 5, 6, or 7, X is a carbon atom, a nitrogen atom, or a combination thereof, n is not less than 1 and not more than 4, and m is more than n but not more than 5, and
a modifier or terminal T exists on a surface of the layer body, wherein T is at least one selected from the group consisting of a hydroxyl group, a fluorine atom, a chlorine atom, an oxygen atom, or a hydrogen atom; and
one or more transition elements selected from the group consisting of Ti, V, Cr, Zr, Nb, Mo, Hf, Ta, W, or Y, wherein an ion of the one or more transition elements is present between adjacent layers of the one or plural layers of the particles of the layered material.

2. The conductive film according to claim 1, wherein the one or more transition elements are supported on the layer body.

3. The conductive film according to claim 1, wherein an ion of the one or more transition elements is supported on the layer body.

4. The conductive film according to claim 1, wherein the particles of the layered material include plural layers, and the one or more transition elements are present between the plural layers.

5. The conductive film according to claim 4, wherein the $M_mX_n$ is $Ti_3C_2$,
the transition element is Ti, and
the conductive film has a peak at 52° to 58° and a peak at 45° to 49° in a profile obtained by X-ray diffraction measurement.

6. The conductive film according to claim 1, wherein the $M_mX_n$ is $Ti_3C_2$,
the transition element is Ti, and
the conductive film has a peak at 52° to 58° and a peak at 45° to 49° in a profile obtained by X-ray diffraction measurement.

7. The conductive film according to claim 1, wherein the conductive film has a first peak at 52° to 58° and a second peak at 45° to 49° in a profile obtained by X-ray diffraction measurement.

8. The conductive film according to claim 7, wherein an angle difference between the first peaks and the second peak is in a range of 7° to 10°.

9. An electrode including the conductive film according to claim 1.

10. An electromagnetic shield including the conductive film according to claim 1.

11. A method for producing a conductive film, the method comprising:
(a1) preparing a precursor film including particles of a layered material including one or plural layers, the one or plural layers including a layer body represented by:

$$M_mX_n$$

wherein M is at least one metal of Group 3, 4, 5, 6, or 7, X is a carbon atom, a nitrogen atom, or a combination thereof, n is not less than 1 and not more than 4, and m is more than n but not more than 5, and a modifier or terminal T exists on a surface of the layer body, wherein T is at least one selected from the group consisting of a hydroxyl group, a fluorine atom, a chlorine atom, an oxygen atom, or a hydrogen atom; and (b1) coating the precursor film with a solution containing one or more transition elements selected from the group consisting of Ti, V, Cr, Zr, Nb, Mo, Hf, Ta, W, or Y in a solvent as ions, wherein the one or more transition elements are present between adjacent layers of the one or plural layers of the particles of the layered material in the conductive film.

12. The method for producing the conductive film according to claim 11, wherein the one or more transition elements are supported on the layer body in the conductive film.

13. The method for producing the conductive film according to claim 11, wherein an ion of the one or more transition elements is supported on the layer body in the conductive film.

14. The method for producing the conductive film according to claim 11, wherein the particles of the layered material include plural layers, and the one or more transition elements are present between the plural layers in the conductive film.

15. The method for producing the conductive film according to claim 14, wherein
the $M_mX_n$ is $Ti_3C_2$,
the transition element is Ti, and
the conductive film has a peak at 52° to 58° and a peak at 45° to 49° in a profile obtained by X-ray diffraction measurement.

16. The method for producing the conductive film according to claim 11, wherein
the $M_mX_n$ is $Ti_3C_2$,
the transition element is Ti, and
the conductive film has a peak at 52° to 58° and a peak at 45° to 49° in a profile obtained by X-ray diffraction measurement.

17. The method for producing the conductive film according to claim 11, wherein the conductive film has a first peak at 52° to 58° and a second peak at 45° to 49° in a profile obtained by X-ray diffraction measurement.

18. The method for producing the conductive film according to claim 17, wherein an angle difference between the first peak and the second peak is in a range of 7° to 10°.

19. A method for producing a conductive film, the method comprising:
(a2) preparing a MAX phase, the MAX phase represented by:

$$M_mAX_n$$

wherein M is at least one metal of Group 3, 4, 5, 6, or 7, X is a carbon atom, a nitrogen atom, or a combination thereof, A is at least one element of Group 12, 13, 14, 15, or 16, n is 1 to 4, and m is more than n and 5 or less;

(b2) performing an etching treatment of removing at least a part of the A atoms from the MAX phase using an etching liquid to obtain an etched product;

(c2) performing an intercalation treatment of a monovalent metal ion including a step of mixing the etched product and a metal compound containing a monovalent metal ion to produce an intercalated product;

(d2) performing a transition element intercalation treatment including a step of mixing the intercalated product with a solution containing one or more transition elements selected from the group consisting of Ti, V, Cr, Zr, Nb, Mo, Hf, Ta, W, or Y in a solvent as ions to obtain a transition element intercalated product; and (e2) obtaining a conductive film by at least partially removing the solvent from the transition element intercalated product, wherein the one or more transition elements are present between adjacent layers of the transition element intercalated product in the conductive film.

* * * * *